United States Patent Office 3,756,989
Patented Sept. 4, 1973

3,756,989
NOVEL POLYETHYLENE TEREPHTHALATE CATALYSTS
John J. Ventura, Eatontown, Melvin H. Gitlitz, Edison, and James Mackey, Colonia, N.J., by James Mackey, Jr., executor of said James Mackey, deceased, Colonia, N.J., assignors to M & T Chemicals Inc., Greenwich, Conn.
No Drawing. Continuation-in-part of abandoned application Ser. No. 836,129, June 24, 1969. This application Mar. 15, 1971, Ser. No. 124,525
Int. Cl. C08g 17/015
U.S. Cl. 260—75 R    6 Claims

ABSTRACT OF THE DISCLOSURE

A process for preparing polyethylene terephthalate wherein dimethyl terephthalate is reacted with ethylene glycol to form an ester of ethylene glycol and terephthalic acid or where terephthalic acid is reacted with ethylene glycol to form an ester of terephthalic acid and ethylene glycol where the resulting ester is polycondensed in the presence of a polycondensation catalyst, the improvement comprising carrying out the condensation or polymerization of the ester in the presence of a catalytic amount of specified trivalent antimony compounds containing three antimony sulfur bonds.

---

This application is a continuation-in-part of our application Ser. No. 836,129 filed June 24, 1969, now abandoned.

This invention relates to an improved method for the preparation of polyethylene terephthalate. More particularly, this invention relates to an improved polycondensation catalyst for use in the manufacture of polyethylene terephthalate, said catalyst being a sulfur-containing trivalent antimony compound.

It is known that polyethylene terephthalate can be prepared from a suitable methyl ester of terephthalic acid formed by initially reacting methyl alcohol with terephthalic acid. When a methyl ester of terephthalic acid is used as a starting material, it is first reacted with ethylene glycol in the presence of a transesterification catalyst by means of an ester interchange reaction. When terephthalic acid, itself, is used as a starting material, it is subjected to a direct esterification reaction with ethylene glycol in the presence of what is generally called the first stage catalytic additive or ether inhibitor. In either method the resulting reaction product, an ester, is then polycondensed in the presence of a polycondensation catalyst to form polyethylene terephthalate.

To polymerize bis($\beta$-hydroxyethyl) terephthalate in a reasonable time it is necessary to use a catalyst. Many catalysts have been disclosed for this purpose but we have found that those giving a rapid production rate also tend to bring about a rapid rate of polymer degradation. Another disadvantage is that many of the known catalysts produce a polymer having a yellowish color. For the manufacture of fibers a color as near white as possible is required and for film making a clear bright polymer is necessary.

An object of this invention is to produce polymers of high molecular weight based upon intrinsic viscosity data. Another object of this invention is to produce a white or colorless polyethylene terephthalate polymer.

SUMMARY OF THE INVENTION

This invention is a process for preparing polyethylene terephthalate wherein dimethyl terephthalate is reacted with ethylene glycol to form an ester of ethylene glycol and terephthalic acid or where terephthalic acid is reacted with ethylene glycol to form an ester of terephthalic acid and ethylene glycol where the resulting ester is polycondensed in the presence of a polycondensation catalyst, the improvement comprising carrying out the condensation or polymerization of the ester in the presence of a catalytic amount of specified trivalent antimony compounds containing three antimony-sulfur bonds.

The sulfur-containing antimony compound is of the formula $(Sb(Y_1)_3$ wherein Y is selected from the group consisting of

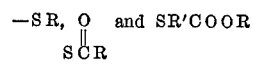

wherein R is a monovalent hydrocarbon radical selected from the group consisting of alkyl, cycloalkyl, aralkyl, aryl and alkaryl radicals and includes such radicals when inertly substituted. R' is a divalent aliphatic hydrocarbon radical containing up to 12 carbon atoms.

DETAILED DESCRIPTION OF THE INVENTION

The antimony compounds include those of the formulae:

$$Sb(SR)_3$$
$$Sb(SR'COOR)_3$$

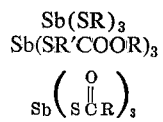

R and R' are as defined above.

In these compounds, R is a hydrocarbon radical preferably selected from the group consisting of alkyl, alkenyl, cycloalkyl, aralkyl, aryl, alkaryl, including such radicals when inertly substituted. Alkyls are typically straight chain alkyl or branched alkyl, including methyl, ethyl, n-propyl, isopropyl, n-butyl, isobutyl, sec-butyl, tert-butyl, n-amyl, neopentyl, isoamyl, n-hexyl, isohexyl, heptyls, octyls, decyls, dodecyls, tetradecyl, octadecyl, etc. Preferred alkyl includes lower alkyl, i.e. having less than about 8 carbon atoms, i.e. octyls and lower. Typical cycloalkyls include cyclopentyl, cyclohexyl, cycloheptyl, cyclooctyl, etc. When R is, aralkyl it may typically be benzyl, $\beta$-phenylethyl, phenylpropyl, $\beta$-phenylpropyl, etc. Typical aryls include phenyl, naphthyl, etc. Typical alkaryls include tolyl, xylyl, p-ethylphenyl, p-nonylphenyl, etc. R may be inertly substituted, e.g. may bear non-reactive substituents such as alkyl, aryl, cycloalkyl, aralkyl, alkaryl, alkenyl, ether halogen, nitro, ester, etc. Typical substituted alkyls include 3-chloropropyl, 2-ethoxyethyl, carboethoxymethyl, etc. Substituted cycloalkyls include 4-methylcyclohexyl, 4-chlorocyclohexyl, etc. Inertly substituted aryl includes chlorophenyl, anisyl, biphenyl, etc. Inertly substituted aralkyl includes chlorobenzyl, p-phenylbenzyl, p-methylbenzyl, etc. Inertly substituted alkaryl includes 3-chloro-5-methylphenyl, 2,6-di-tert-butyl-4-chlorophenyl, etc.

Specific sulfur containing organoantimony compounds operable in the practice of this invention include:

antimony tris-isooctylmercaptoacetate
antimony tris-thiobenzoate
tris-(ethylthio) antimony [Sb(SC$_2$H$_5$)$_3$]
tris-(butylthio) antimony
tris-(octylthio) antimony
tris-(dodecylthio) antimony
antimony tri-S,S',S''-thioacetate
antimony tri-S,S',S''-thiopropionate
antimony tri-S,S',S''-thiobutyrate
antimony tri-S,S',-S''-thiovalerate
antimony tris-S,S',S''-thiotallate (the antimony salt of thioacids derived from tall oil fatty acids)
antimony tris-S,S',S''-butylmercaptoacetate
antimony tris-S,S',S''-octylmercaptopropionate
antimony tris-S,S',S''-butylmercaptopropionate
antimony tris-S,S',S''-octadecylthiomaleate The catalysts of the present invention are conveniently prepared by reacting antimony trioxide with the corresponding mercaptain, mercapto acid or thioacid

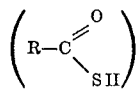

The reaction is preferably carried out in an inert hydrocarbon diluent e.g. benzene which will form an azeotropic mixture with the water formed as a by-product of the reaction. The boiling point of the diluent is preferably between about 80° and 180° C., and the reaction mixture is heated to reflux temperature. Using antimony trioxide and ethyl mercaptoacetate as an example, the reaction between these compounds is believed to proceed according to the following equation

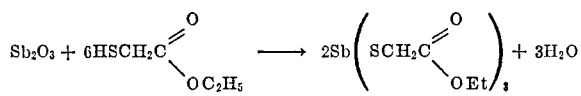

The amount of catalyst required varies depending upon reaction conditions and purity of starting materials. As is usual with catalyst, the amount will be relatively small, generally within the range of from 0.003% to 3.50% based upon the weight of bis($\beta$-hydroxyethyl) terephthalate used. The preferred range is from 0.006% to 3.40% based upon the weight of bis($\beta$-hydroxyethyl) terephthalate to give a satisfactory reaction rate and a product of suitable viscosity and color.

Apart from the enhancement rate of polycondensation by the novel catalysts of this invention, the thermal stability of the resulting polymers is greatly enhanced since compounds comprising the catalyst system remain in the polymer. The presence of the catalysts of this invention greatly enhances subsequent processing operations such as the spinning of fibers and the casting of films, which operations are carried out from a polymer melt at elevated temperatures.

The preparation of esters by an ester interchange reaction is generally carried out with a molar ratio of ethylene glycol to dimethyl terephthalate of from about 1:1 to 15:1, respectively, but preferably from about 2:1 to 3:1. The transesterification reaction is generally carried out at atmospheric pressure in an inert atmosphere such as nitrogen, initially at a temperature range of from about 125° C. to 290° C., but preferably around 150° C. to 260° C., in the presence or absence of a transesterification catalyst. During the first stage, methyl alcohol is evolved and is continually removed by distillation. Employing procedures heretofore known in the art, the ester interchange portion of the reaction or the first step, requires approximately 1 to 4 hours.

Any known suitable transesterification catalyst may be used in the first stage. The transesterification catalyst is used in concentrations from about 0.01% to 0.2% based on the weight of the dimethyl terephthalate used in the initial reaction mixture. Although the novel catalyst combination of this invention is not, itself, an esterification interchange catalyst, it may, in general be added in the esterification interchange catalyst if desired.

The preparation of esters of terephthalic acid and ethylene glycol by direct esterification reaction is generally carried out with a molar ratio of ethylene glycol to terephthalic acid of from about 1:1 to 15:1, preferably about 2:1 to 3:1. The direct esterification reaction is carried out at temperatures ranging from about 170° C. to 290° C. in the absence of an oxygen containing atmosphere at atmospheric or elevated temperatures for about 2 to 3 hours to form the desired ester product. Air is removed, for example, by purging with nitrogen or other oxygen-free inert gas. The polycondensation step, or the polymerization step, of the present invention is effected by adding the antimony compound to bis(2-hydroxyethyl) terephthalate, and heating the mixture thereof under reduced pressure within the range of from about 0.001 millimeters to 10 millimeters of mercury while agitated at a temperature from about 250° C. to 300° C. for from 1 to 4 hours. In accordance with this invention, the novel catalyst mixture is generally employed in amounts ranging from about 0.001% to 0.2% based on the weight of the ester to be condensed. Higher or lower concentrations of the novel catalyst mixture of this invention can also be used in the subject polycondensation reaction.

Polymers prepared in accordance with applicants' invention may be formed by conventional methods of spinning and casting into shaped articles such as films, tapes, fibers, bristles, and the like. The polymers can be used in the preparation of ions, woven and non-woven fabrics, papers, leathers, and other structures by methods well known in the art.

The following examples illustrate the invention particularly with respect to the preparation of polyesters by starting with dimethyl esters of terephthalic acid and ethylene glycol. The catalysts of this invention are also operable in catalyzing the polymerization of other esters of terephthalic acid such as the ethyl, propyl, butyl, and phenyl esters. Glycols, such as the propylene glycols, the butylene glycols, and other glycols such as 1,4-cyclohexane dimethanol, 1,4-phenyl dimethanol, and 2,2-bis[4-($\beta$-hydroxyethyl)] phenylpropane can also be used, although ethylene glycol is preferred because of its low cost and ready availability.

The following examples illustrate the present invention and the advantages thereof it being understood that these are illustrative and not limitative. Unless otherwise indicated, all parts and percents are by weight.

Example 1

This example illustrates a complete two-step process in the preparation of polyethylene terphthalate from dimethyl terephthalate and ethylene glycol.

2000 parts by weight of dimethyl terephthalate, 1400 parts by weight of ethylene glycol, and 0.3 part by weight of zinc acetate were heated in a three-necked flask, equipped with a stirrer and a condenser, at atmospheric pressure until that quantity of methanol theoretically calculated to evolve had been distilled off (viz 836 milliliters of methanol). The zinc acetate esterification catalyst was sequestered by adding 1.38 parts of tri-nonylphenyl phosphite, stirring and heating the reaction mixture for fifteen minutes. The bis($\beta$-hydroxyethyl) terephthalate product was then isolated.

35.0 grams of the bis($\beta$-hydroxyethyl) terephthalate monomer and 0.0175 gram of antimony tris-S,S',S''-thiobenzoate were added to a polyester reactor preheated to 250° C. The temperature of the reactor was then adjusted to 280° C. simultaneously with the application of a vacuum of 0.25 millimeter of mercury. The polymerization was allowed to proceed for 4 hours. The ethylene glycol formed as a result of the polymerization was distilled off and collected. Upon cooling, the polyethylene terephthalate product exhibited an intrinsic viscosity of 0.53 and a melting point of 265° C.

Example 2

The process of Example 1 was followed except that the charge added to the polymerization reactor consisted of 35.0 grams of bis($\beta$-hydroxyethyl) terephthalate and 0.0175 gram of antimony tris-isooctylmercaptoacetate. The polymerization reaction was allowed to proceed for 3 hours. Upon cooling, the polyethylene terephthalate product exhibited an intrinsic viscosity of 0.62 and a melting point of 260° C.

We claim:

1. In a process for preparing fiber- and film-forming polyethylene terephthalate wherein dimethyl terephthalate is reacted with ethylene glycol to form an ester of ethylene glycol and terephthalic acid or wherein terephthalic acid is reacted with ethylene glycol to form an ester of terephthalic acid and ethylene glycol and the resulting ester is polycondensed in the presence of a polycondensation catalyst, the improvement comprising carrying out the polycondensation of the ester in the presence of a catalyst comprising an effective amount of a trivalent antimony compound of the formula $Sb(Y)_3$ wherein Y is selected from the group consisting of

and —SH'COOR, wherein R is a monovalent hydrocarbon radical selected from the group consisting of alkyl, cycloalkyl, aralkyl, aryl and alkaryl radicals, including such radicals when inertly substituted, and R' is a divalent aliphatic hydrocarbon radical containing up to 12 carbon atoms.

2. The process of claim 1 wherein said antimony compound is of the formula $Sb(SR''COOR')_3$.

3. The process of claim 2 wherein said antimony compound is antimony tris-S,S',S''-isooctylmerecaptoacetate.

4. The process of claim 1 wherein said antimony compound is of the formula

5. The process of claim 4 wherein said antimony compound is antimony tris-thiobenzoate.

6. In a process for preparing fiber- and film-forming polyethylene terephthalate wherein dimethyl terephthalate is reacted with ethylene glycol to form an ester of ethylene glycol and terephthalic acid or wherein terephthalic acid is reacted with ethylene glycol to form an ester of terephthalic acid and ethylene glycol and the resulting ester is polycondensed in the presence of a polycondensation catalyst, the improvement comprising carrying out the polycondensation of the ester in the presence of a catalyst comprising an effective amount of a trivalent antimony compound of the formula $Sb(SR)_3$ wherein R represents an alkyl, a cycloalkyl or an aralkyl hydrocarbon radical.

References Cited
UNITED STATES PATENTS 3,415,787 12/1968 Carlson et al. _____ 260—75

FOREIGN PATENTS 1,480,557 5/1967 France.
6,610,227 1/1967 Netherlands.

MELVIN GOLDSTEIN, Primary Examiner